M. D. CAMPBELL.
FLY TRAP.
APPLICATION FILED MAR. 26, 1913.
1,103,656.
Patented July 14, 1914.
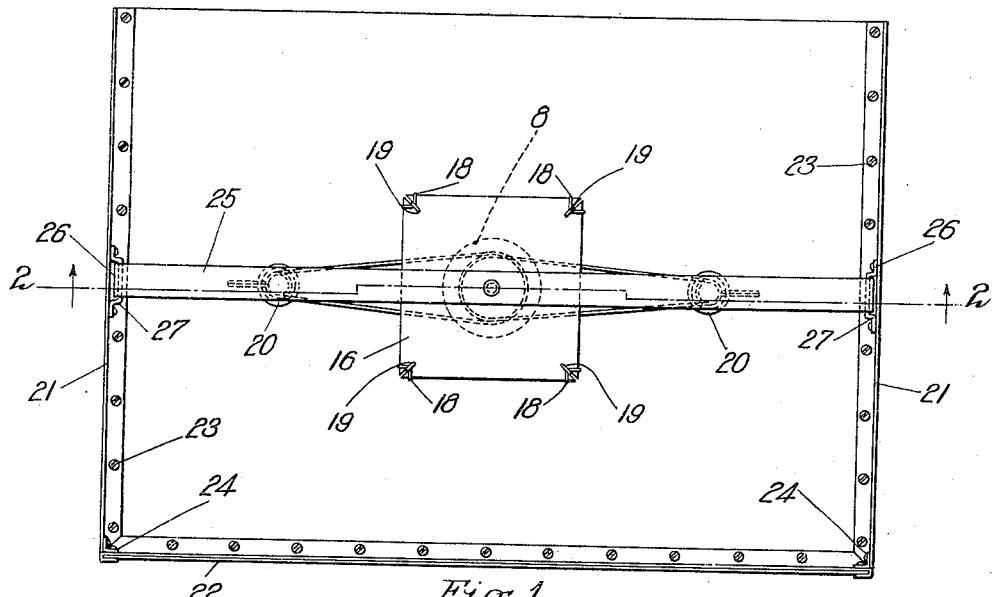
Fig. 1
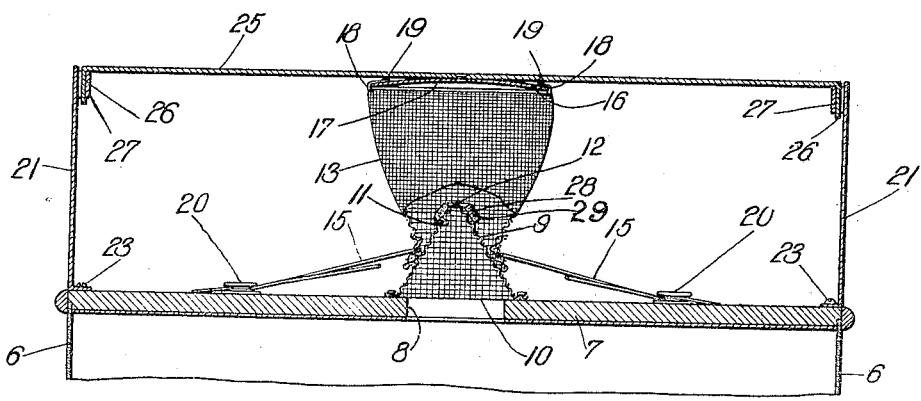
Fig. 2.
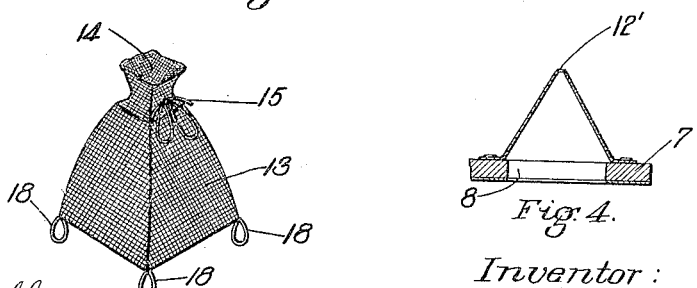
Fig. 3.
Fig. 4.
Witnesses:
Leonard A. Powell.
Franklin E. Low.
Inventor:
Matthew D. Campbell
by his attorney,
Charles S. Goodrich.

UNITED STATES PATENT OFFICE.

MATTHEW D. CAMPBELL, OF BOSTON, MASSACHUSETTS.

FLY-TRAP.

1,103,656.  Specification of Letters Patent.  Patented July 14, 1914.

Application filed March 26, 1913. Serial No. 756,847.

*To all whom it may concern:*

Be it known that I, MATTHEW D. CAMPBELL, a citizen of the United States, residing at Boston, in the county of Suffolk and State of Massachusetts, have invented new and useful Improvements in Fly-Traps, of which the following is a specification.

This invention relates to fly traps.

The object of the invention is to provide a simple, inexpensive device which is particularly adapted to be used in connection with food receptacles to attract and trap flies which have obtained access to said food receptacle.

The object of the invention is further to provide a device adapted to confine the flies as they emerge from said receptacle, which may be removed when desired and emptied of the flies which have already been caught thereby.

The invention consists in the combination and arrangement of parts whereby the above objects and certain other objects hereinafter appearing are attained, as set forth in the following specification and particularly pointed out in the claim.

Referring to the drawings: Figure 1 is a plan view of a device embodying my invention. Fig. 2 is a section partly in elevation taken on line 2—2 of Fig. 1. Fig. 3 is a detail perspective view of the fly retainer. Fig. 4 is a modified form of the conductor for conducting flies from the food receptacle into said retainer.

Like numerals refer to like parts throughout the several views of the drawings.

In the drawings, 6 represents a case, preferably constituting a food receptacle such as is provided for exhibiting pastry or the like, and whose sides are constructed of glass, while the top 7 is preferably of wood and provided with an opening 8 constituting a ventilator. A fly conductor or screen 9, preferably cone shaped, although the use of a pyramidal or cup-shaped screen would not be a departure from the spirit of the invention, and constructed of wire gauze, is secured at its base 10 to the top 7 and surrounds said hole 8. The smaller end 11 of said screen extends away from said wall 7 and is provided at its extremity with a central opening 12, said opening being substantially smaller than the opening 8 and of a size sufficient to permit the passage therethrough of the flies one at a time. A fly retainer 13 is arranged to envelop the small end 11 of the fly conductor 9 and catches all flies which emerge from said conductor through the opening 12. This retainer is preferably a sack or net of textile material, which is closed at one end and provided with an opening 14 at its opposite end and adapted to be closed by cords 15 arranged in the hem of said sack and which may be drawn tight and tied. A plate 16 is arranged at a distance from the end 11 of said screen and is provided with a bright concaved surface 17, this surface being disposed toward said screen and being for the purpose of attracting flies from the receptacle 6, and from said plate the sack or fly retainer 13 is suspended by means of loops 18 at the corners thereof adapted to engage hooks 19 on said plate. The cords 15 which are provided for the purpose of closing said sack, upon the removal thereof from the screen, are also for the purpose of drawing the open end of said receptacle tightly over said screen at a distance from the end 11 thereof when the same is suspended from the plate 16, said cords 15 being secured by cleats 20 upon the top of the case 6. The fly conductor 9 is also provided, adjacent its small end 11 and upon the exterior thereof, with a pad 28 which surrounds the opening 12 and whose outer surface 29 is perforated. This pad is filled with a suitable powdered substance which is objectionable to or may kill the flies coming in contact therewith, particularly when said flies attempt to crawl up the outside of said conductor 9 from the interior of said sack to the opening 12. By reason of said pad being upon the interior of said conductor, with the thickness of the material constituting said conductor between said pad and the path of the flies entering the same, there will be no danger of interrupting the passage of the flies attempting to enter said trap. Furthermore the inner wall of said sack may, if desired, be constructed of imperforate material to absolutely prevent powder contained therein from sifting through to the interior of said conductor.

It is desirable that the fly trap be invisible from the front and sides of the case and to accomplish this a wall of sheet material, preferably metal, is provided to inclose the same and consists of side walls 21 and the front wall 22, which are secured by screws 23 to the top 7 of said case, while said side and front walls are connected together by angles 24 at the abutting edges thereof. These walls may, if desired, be utilized for displaying signs which may be secured thereto in any suitable manner.

To further support the side walls 21 a tie-piece 25 is provided which extends from one to the other of the walls 21 substantially midway thereof, and this tie-piece is provided with depending ends 26 which engage sockets 27 secured to the inner faces of said side walls 21, said tie-piece also constituting a support for the plate 16.

In Fig. 4, I have illustrated a modified form of fly conductor which may be either a cone shaped or pyramidal conductor, but constructed of sheet material instead of wire gauze and otherwise identical in shape with the conductor 9.

When the device, hereinbefore specifically described, is in use the flies which gain admittance to the food receptacle within the case 6, in one way or another, but usually when the slide or door thereof is opened, will be attracted by the bright surface 17 of the plate 16 which will be seen through the opening 12 in the netting or conductor 9. By reason of this attraction said flies will crawl through the opening 8 and up the inclined sides of the conductor 9 and through the opening 12, one at a time, from which they will fly to the under side of the plates 16, or attempt to escape therefrom, but will be prevented from so doing by the net 13. Should any of the flies attempt to crawl down the sides of the net 13 and onto the outer surface of the conductor 9 they will be prevented from returning through the opening 12 in said conductor by the pad 28.

When it is desired to remove the flies which have been caught in the retainer 13, the loops 18 thereof are released from the plate 16 and the cords 15 are released from the cleats 20 after which said cords are drawn tight as the open end 14 of said sack is withdrawn from the end of the conductor 9, to close said end, and the ends of the cords 15 may be tied together to keep said sack closed and retain the flies therein until they have been killed. The sack may then be emptied and washed and replaced in position over said food receptacle.

Having thus described my invention, what I claim and desire by Letters Patent to secure is:

In a fly trap an attractive plate, a fly retainer detachably secured to said plate, said fly retainer having an opening in one end thereof, means adapted to conduct flies to said retainer, said means including a cone shaped screen, the smaller end thereof adapted to project into and be enveloped by said retainer and provided with an opening, and a powder pad secured to the interior of said cone shaped screen adjacent to and surrounding the opening in the small end of said conductor, the outer surface of said pad being perforated.

In testimony whereof I have hereunto set my hand in presence of two subscribing witnesses.

MATTHEW D. CAMPBELL.

Witnesses:
SYDNEY E. TAFT,
MARGARET E. HORN.